United States Patent
Soylu

(10) Patent No.: US 10,683,916 B2
(45) Date of Patent: Jun. 16, 2020

(54) MECHANICAL TORQUE GENERATOR AND RELATED KINEMATIC CHAINS

(71) Applicant: Resit Soylu, Ankara (TR)

(72) Inventor: Resit Soylu, Ankara (TR)

( * ) Notice: Subject to any disclaimer, the term of this patent is extended or adjusted under 35 U.S.C. 154(b) by 1028 days.

(21) Appl. No.: 15/036,061

(22) PCT Filed: Nov. 6, 2014

(86) PCT No.: PCT/TR2014/000414
§ 371 (c)(1),
(2) Date: May 11, 2016

(87) PCT Pub. No.: WO2015/069208
PCT Pub. Date: May 14, 2015

(65) Prior Publication Data
US 2016/0265636 A1 Sep. 15, 2016

(30) Foreign Application Priority Data

Nov. 11, 2013 (TR) .................................. 2013 13065

(51) Int. Cl.
*F16H 25/18* (2006.01)
*F16H 21/10* (2006.01)

(52) U.S. Cl.
CPC ........... *F16H 25/183* (2013.01); *F16H 21/10* (2013.01)

(58) Field of Classification Search
CPC ............................... F16H 25/183; F16H 21/10
USPC ........................................................ 74/99 R
See application file for complete search history.

(56) References Cited

U.S. PATENT DOCUMENTS

2005/0241418 A1   11/2005   Damrath et al.
2016/0290454 A1*  10/2016   Soylu .................... F16H 25/183

FOREIGN PATENT DOCUMENTS

DE   10256091 A1   6/2004
SU     887841 A1  12/1981
SU    1249242 A1   8/1986

OTHER PUBLICATIONS

Artibolevskiy, I.I.; Mechanizny v sovremennoy tekhnike, 2-e izdanie, pererabotannoe, tom 1, Moska "Nauka" 1979, p. 45, mechanism No. 931, p. 49, mechanism No. 937.

(Continued)

*Primary Examiner* — David H Bollinger
(74) *Attorney, Agent, or Firm* — Venjuris PC

(57) ABSTRACT

This invention is related to a mechanical torque generator (MTG) (11), the cost, the maintenance costs and the energy consumption of which have been minimized, as much as possible, since the reaction forces, the reaction moments and the frictional forces at the joints that connect the mechanism to the ground have been minimized as much as possible; which does not possess any actuators; and which can generate any desired torque variation. MTG (11) may be obtained by using 3 novel kinematic chains. By using these kinematic chains, it is also possible to obtain general purpose mechanisms, which have advantages similar to the MTG (11); which may include an actuator; which may generate relative rotational motion at a joint as any desired function of relative translational motion at another joint; which may be used in many different fields such as hydraulic and pneumatic machines, internal combustion engines and compressors.

6 Claims, 6 Drawing Sheets

(56) References Cited

OTHER PUBLICATIONS

Artibolevskiy, I.I.; Mechanizny v sovremennoy tekhnike, tom 4, Moska "Nauka" 1975, p. 39, mechanism Nos. 729, 730.
Supp. International Search Report for PCT/TR2014/000414 and references cited therein.

* cited by examiner

| LINK NUMBER | 1 | 2 | 3 | 4 | 5 | 6 | 7 | 8 | 9 |
|---|---|---|---|---|---|---|---|---|---|
| 1 | ■ | R | P | R | P | | | | |
| 2 | R | ■ | | | | R | | R | |
| 3 | P | | ■ | | | $C_s$ | $C_s$ | | |
| 4 | R | | | ■ | | | R | | R |
| 5 | P | | | | ■ | | | $C_s$ | $C_s$ |
| 6 | | R | $C_s$ | | | ■ | | | |
| 7 | | | $C_s$ | R | | | ■ | | |
| 8 | | R | | | $C_s$ | | | ■ | |
| 9 | | | | R | $C_s$ | | | | ■ |

Figure 3

|  | EQUATIONS THAT THE KINEMATIC DIMENSIONS MUST SATISFY | EQUATIONS THAT THE INERTIAL PARAMETERS MUST SATISFY | EQUATIONS THAT THE LOADING CONDITIONS MUST SATISFY |
|---|---|---|---|
| MTG | (E10) – (E22) | (E26) – (E44) | (E45) – (E48) |
| MinFaS-TaR | (E10) – (E22) | (E26) – (E44) | (E48) & (E55) – (E57) |

Figure 6

MECHANICAL TORQUE GENERATOR AND RELATED KINEMATIC CHAINS

TECHNICAL FIELD

This invention is related to a mechanical torque generator (MTG), the cost, the maintenance cost and the energy consumption of which has been reduced as much as possible; which doesn't include any actuators; which can generate any desirable torque variation; and this invention is also related to general purpose mechanisms, which can be obtained from the 3 novel kinematic chains that the MTG has been derived from; which can be used in many different applications, such as hydraulically and pneumatically actuated machines, internal combustion engines and compressors; which possess advantages similar to the MTG; and which may include actuators.

BACKGROUND ART

In the literature, there are many 1 degree of freedom planar mechanisms, the input link of which is translating, whereas the output link is rotating. For example, in FIG. 1, the slider crank mechanism, which is a one degree of freedom, planar mechanism, is shown with the input and output parameters being denoted by $s_i$ and $\theta_o$. In this mechanism, it is possible to generate, approximately, any desired torque $T(\theta_o)$; and any input-output relation, given by equation (E1), by properly designing the kinematic dimensions, the free length of the spring used, and the spring constant k. Although the input-output relation given by equation (E1) and the desired torque, $T(\theta_o)$, can be produced only approximately in the slider crank mechanism; it is possible to generate, as much as the physical constraints allow, any desired input-output relation and any desired torque without making any approximations (i.e., exactly in the desired manner) by using mechanisms that include a cam pair and/or a cylinder in slot joint.

Figure 1:
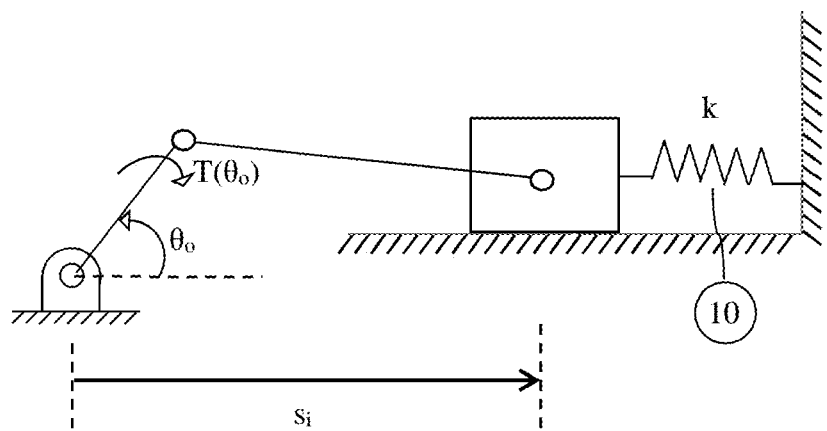

The slider crank mechanism shown in FIG. 1 is connected to the ground by 1 prismatic joint and 1 revolute joint. The reaction forces, reaction moments and frictional forces that occur at these 2 joints constitute the shaking forces and moments exerted on the ground. The aforementioned shaking forces and moments will depend upon the $T(\theta_o)$ torque that is generated, the inertia forces and moments, due to D'Alembert's principle, that act on the moving links; and the weights of the links. In general, in this type of an application, the shaking forces and moments will, to a large extent, be due to the $T(\theta_o)$ torque and the inertia forces and moments; and the contribution of the weights of the links to the shaking forces and moments will be relatively smaller.

As is well known, the shaking forces and moments cause undesirable noise and vibrations at the bearings that connect the mechanism to the ground. Due to these reasons, the mechanism works in a disturbingly noisy manner and the bearings wear out quickly. Although the measures taken to prevent the noise and the vibrations cannot provide a fully satisfactory solution, they increase the cost of the system. Furthermore, due to the friction at the 2 joints that connect the mechanism to the ground, extra energy, which adversely affects the energy consumption of the mechanism, is consumed.

DISCLOSURE OF THE INVENTION

One of the purposes of this invention is to realize a mechanical torque generator (11), such that, the wear at the joints that connect the mechanism to the ground is minimum since the reaction forces, reaction moments and friction forces at these joints are, to a great extent, due to the weights of the links only;

such that, the lives of the joints that connect the mechanism to the ground is maximum since the reaction forces, reaction moments and friction forces at these joints are, to a great extent, due to the weights of the links only;

such that, the maintenance costs of the joints that connect the mechanism to the ground are minimum since the lives of these joints have been maximized as much as possible;

such that, the shaking forces and moments transmitted to the ground are minimum since the reaction forces, reaction moments and friction forces at these joints are, to a great extent, due to the weights of the links only;

such that, the noise generated by the mechanism is minimum since the shaking forces and moments transmitted to the ground have been minimized;

such that, the vibrations transmitted to the ground is minimum since the shaking forces and moments transmitted to the ground have been minimized;

such that, the costs related to preventing noise and vibrations in the mechanism are minimum since the noise and the vibrations transmitted to the ground have been minimized as much as possible;

such that, the energy consumption of the mechanism is minimum since the friction forces at the joints that connect the mechanism to the ground are, to a great extent, due to the weights of the links only;

which, without using any actuators and by using only springs, can generate any desired torque variation.

Another purpose of the invention is to realize a general purpose mechanism, such that, the wear at the joints that connect the mechanism to the ground is minimum since the reaction forces, reaction moments and friction forces at these joints are, to a great extent, due to the weights of the links only;

such that, the lives of the joints that connect the mechanism to the ground is maximum since the reaction forces, reaction moments and friction forces at these joints are, to a great extent, due to the weights of the links only;

such that, the maintenance costs of the joints that connect the mechanism to the ground are minimum since the lives of these joints have been maximized as much as possible;

such that, the shaking forces and moments transmitted to the ground are minimum since the reaction forces, reaction moments and friction forces at these joints are, to a great extent, due to the weights of the links only;

such that, the noise generated by the mechanism is minimum since the shaking forces and moments transmitted to the ground have been minimized;

such that, the vibrations transmitted to the ground is minimum since the shaking forces and moments transmitted to the ground have been minimized;

such that, the costs related to preventing noise and vibrations in the mechanism are minimum since the noise and the vibrations transmitted to the ground have been minimized as much as possible;

such that, the energy consumption of the mechanism is minimum since the friction forces at the joints that connect the mechanism to the ground are, to a great extent, due to the weights of the links only;

in which, the rotational motion of the output link can be obtained as any desired function of the translational motion of the input link;

that can be used in many different areas, such as hydraulically or pneumatically actuated machines, internal combustion engines and compressors.

Another purpose of the invention is to realize a general purpose mechanism, such that, the wear at the joints that connect the mechanism to link number 1 is minimum since the reaction forces, reaction moments and friction forces at these 4 joints are, to a great extent, due to the weights of the links and due to the external forces, external moments, inertia forces and inertia moments acting, only, on link number 1;

such that, the lives of the joints that connect the mechanism to link number 1 is maximum since the reaction forces, reaction moments and friction forces at these 4 joints are, to a great extent, due to the weights of the links and due to the external forces, external moments, inertia forces and inertia moments acting, only, on link number 1;

such that, the maintenance costs of the joints that connect the mechanism to link number 1 are minimum since the lives of these 4 joints have been maximized as much as possible;

such that, the energy consumption of the mechanism is minimum since the friction forces at the 4 joints that connect the mechanism to link number 1 are, to a great extent, due to the weights of the links and due to the external forces, external moments, inertia forces and inertia moments acting, only, on link number 1;

in which, the relative rotational motion at a joint can be obtained as any desired function of the relative translational motion at another joint;

that can be used in many different areas, such as hydraulically or pneumatically actuated machines, internal combustion engines and compressors.

BRIEF DESCRIPTION OF THE INVENTION

A mechanism is a mechanical system which consists of links, connected to each other by joints; and, which is used to transfer motion and/or force from one location to another. High reaction forces and moments, and high frictional forces and moments that occur at the joints of a mechanism not only cause early wearing of the bearings; but, increase the energy consumption of the mechanism as well. Furthermore, mechanisms exert shaking forces and shaking moments to the ground that they are mounted on. The aforementioned shaking forces and moments are due to the reaction forces, reaction moments, frictional forces and frictional moments that occur at the joints that connect the mechanism to the ground; causing undesirable vibrations on the ground and noise.

The invention mentioned in this description is related to a one degree of freedom (as far as its practical usage is concerned), overconstrained (or, in permanently critical form), novel planar mechanism, the input link of which translates; whereas, the output link of which rotates around a fixed axis. In this description, the input and output links refer to any two links which are connected to the ground with a joint; and, the frequently used assumption, which states that the input link is the link which actuates the mechanism, has not been used. The rotational motion of the output link of the aforementioned original mechanism can be obtained as any desired function of the translational motion of the input link. Furthermore, provided that the kinematic dimensions, the inertial parameters of the links and the loading conditions of this novel mechanism satisfy certain conditions; the shaking forces transmitted to the ground, the shaking moments transmitted to the ground and the friction forces at the joints that connect the mechanism to the ground will be minimum, since, basically, they will depend on the weights of the links only. Since the frictional forces are minimized, the energy consumption of the mechanism will be minimum. The mechanical torque generator, which is the subject of this invention; which can produce any desired torque; for which the shaking forces transmitted to the ground, the shaking moments transmitted to the ground, the frictional forces at the joints that connect the mechanism to the ground, and hence the energy consumption of the mechanism, are minimum; is obtained by mounting springs between some of the links of the novel mechanism mentioned above.

In this description, the mechanism named as the $EqMTG_{1\&2}$ mechanism is a mechanism which is obtained by replacing the revolute joint (18) in the MTG mechanism by a cylinder in slot joint; and it is a mechanism which is not in permanently critical form (or, not overconstrained). This aforementioned cylinder in slot joint causes the path, on link 1, of point $(O_2)_2$ to be coincident with the $x_1$ axis; and it also causes link 2 to rotate, relative to link 1, around an axis which is parallel to the $z_1$ axis and which passes through the point $(O_2)_2$. Here, $(O_2)_2$ designates the origin $O_2$ on link 2 (See FIG. 2). In case the kinematic dimensions and input motions of the MTG (11) and $EqMTG_{1\&2}$ mechanisms are the same, the motions of the two mechanisms will be identical.

$EqMTG_{1\&3}$ mechanism (12), on the other hand, is another mechanism which is not in permanently critical form (or, not overconstrained); and which is obtained from the MTG mechanism (11) by replacing the prismatic joint (20) by the cylinder in slot joint (26). This aforementioned cylinder in slot joint (26), causes the path, on link 1, of point $U3_3$ to be coincident with the $y_1$ axis; and it causes link 3 to rotate, relative to link 1, around an axis which is parallel to the $z_1$ axis and which passes through the point $U3_3$ Here, $U3_3$ designates a point on link 3 which is located on the $y_3$ axis. Similar to the $EqMTG_{1\&2}$ mechanism, in case the kinematic dimensions and input motions of the MTG (11) and $EqMTG_{1\&3}$ (12) mechanisms are the same, the motions of the two mechanisms will be identical. As was the case in the MTG mechanism (11), provided that the kinematic dimensions, the inertial parameters of the links and the loading conditions of the $EqMTG_{1\&2}$ and $EqMTG_{1\&3}$ (12) mechanisms satisfy certain conditions, the shaking forces transmitted to the ground, the shaking moments transmitted to the ground and the friction forces at the joints that connect the mechanism to the ground, and because of this, the energy consumption of the mechanism, are minimum.

All of the mechanisms that are obtained by the method of kinematic inversion from the kinematic chains that the MTG (11), $EqMTG_{1\&2}$ and $EqMTG_{1\&3}$ (12) mechanisms are derived from, possess advantages similar to the MTG (11), $EqMTG_{1\&2}$ and $EqMTG_{1\&3}$ (12) mechanisms. In these mechanisms that are obtained by the kinematic inversion method, the relative rotational motion at a joint can be obtained as any desired function of the relative translational motion at another joint. Furthermore, provided that the kinematic dimensions, the inertial parameters of the links and the loading conditions of the aforementioned mechanisms satisfy certain conditions, the reaction forces, the reaction moments and the Coulomb friction forces at each of the 4 joints (18), (20), (19), (21) that connect link 1 to links 2, 3, 4 and 5 of these mechanisms, to a great extent, will arise from the the external forces and external moments acting on link 1 and the inertia forces and inertia moments, due to D'Alembert's principle, acting on link 1; and they will be, to a great extent, independent from the external forces and external moments that are acting on links other than link 1 and the accelerations of the links other than link 1.

BRIEF DESCRIPTION OF THE DRAWINGS AND REFERENCES

"A Mechanical Torque Generator and Related Kinematic Chains" that is realized to achieve the purpose of this invention is shown in the attached figures, which are listed below.

FIG. 1—Schematic view of a slider crank mechanism that exists in the literature.

Figure 2:
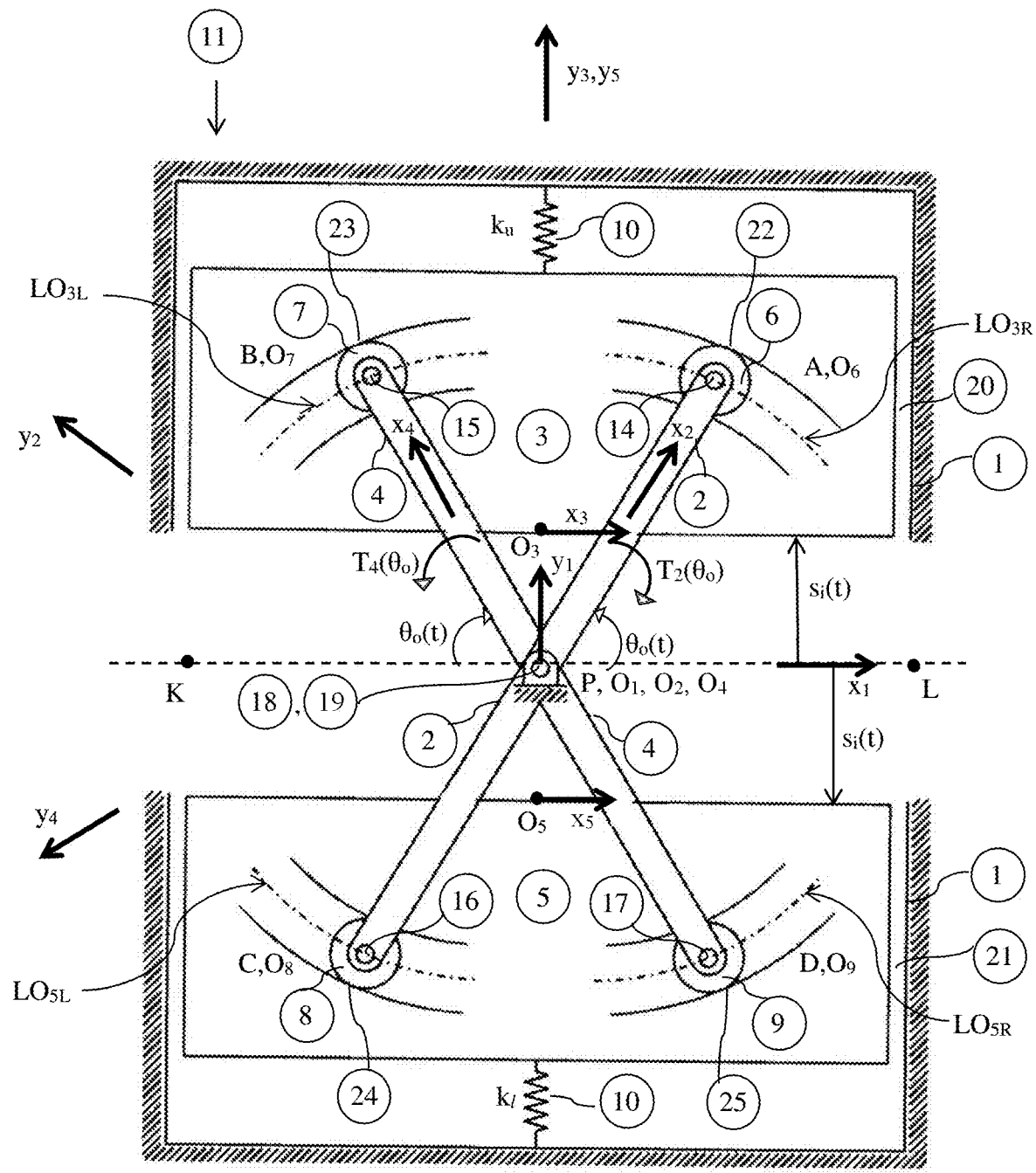

FIG. 2—Schematic view of the mechanical torque generator (11) that is the subject of the invention.

FIG. 3—Table showing the joints that are used in the mechanical torque generator (11) that is the subject of the invention.

Figure 4:
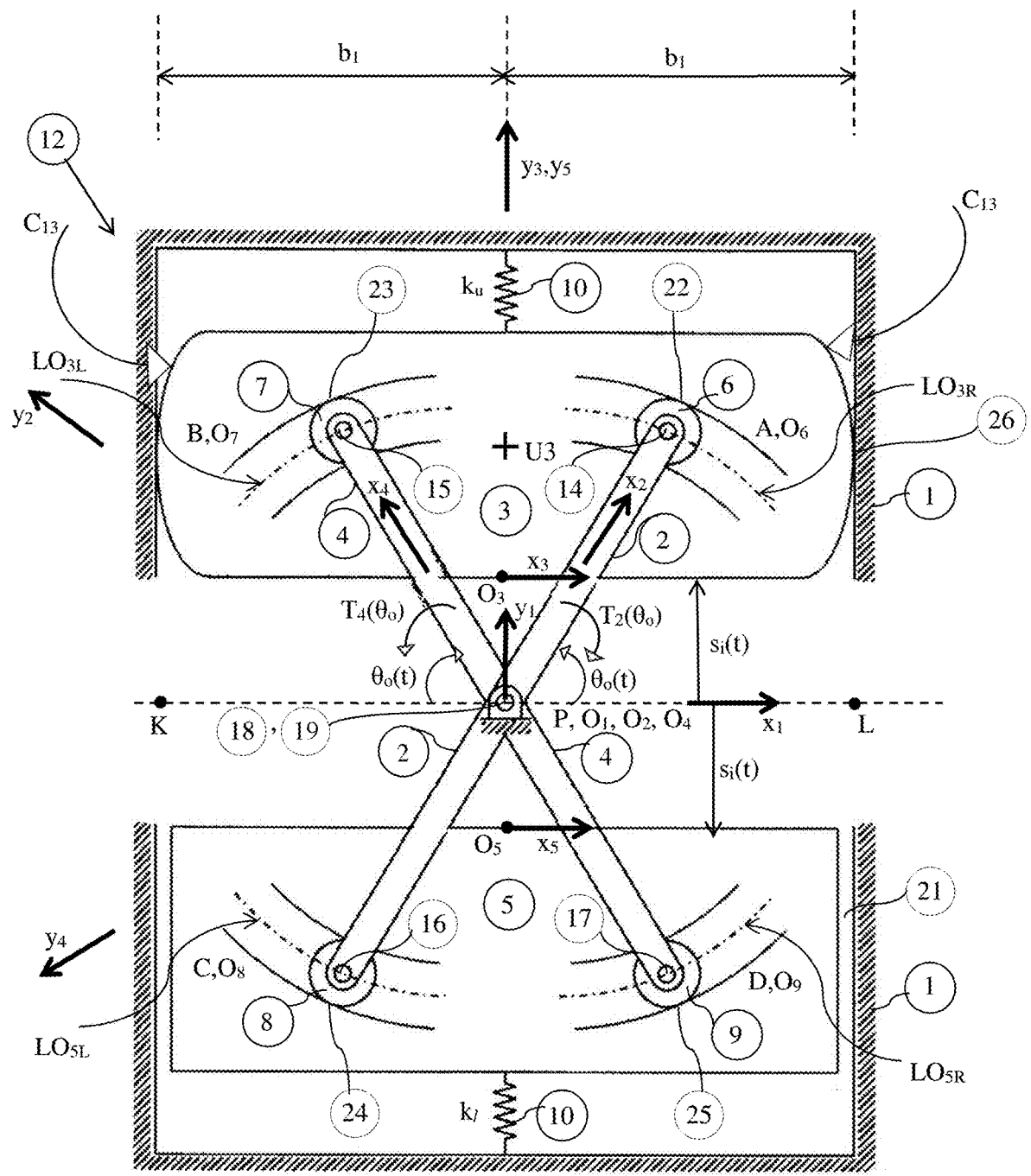

FIG. 4—Schematic view of the mechanism named as Equivalent Mechanical Torque Generator 1 & 3 (EqMTG$_{1\&3}$) (12), which is obtained by replacing the prismatic joint (20) in the mechanical torque generator (11) with a cylinder in slot joint (26).

Figure 5:
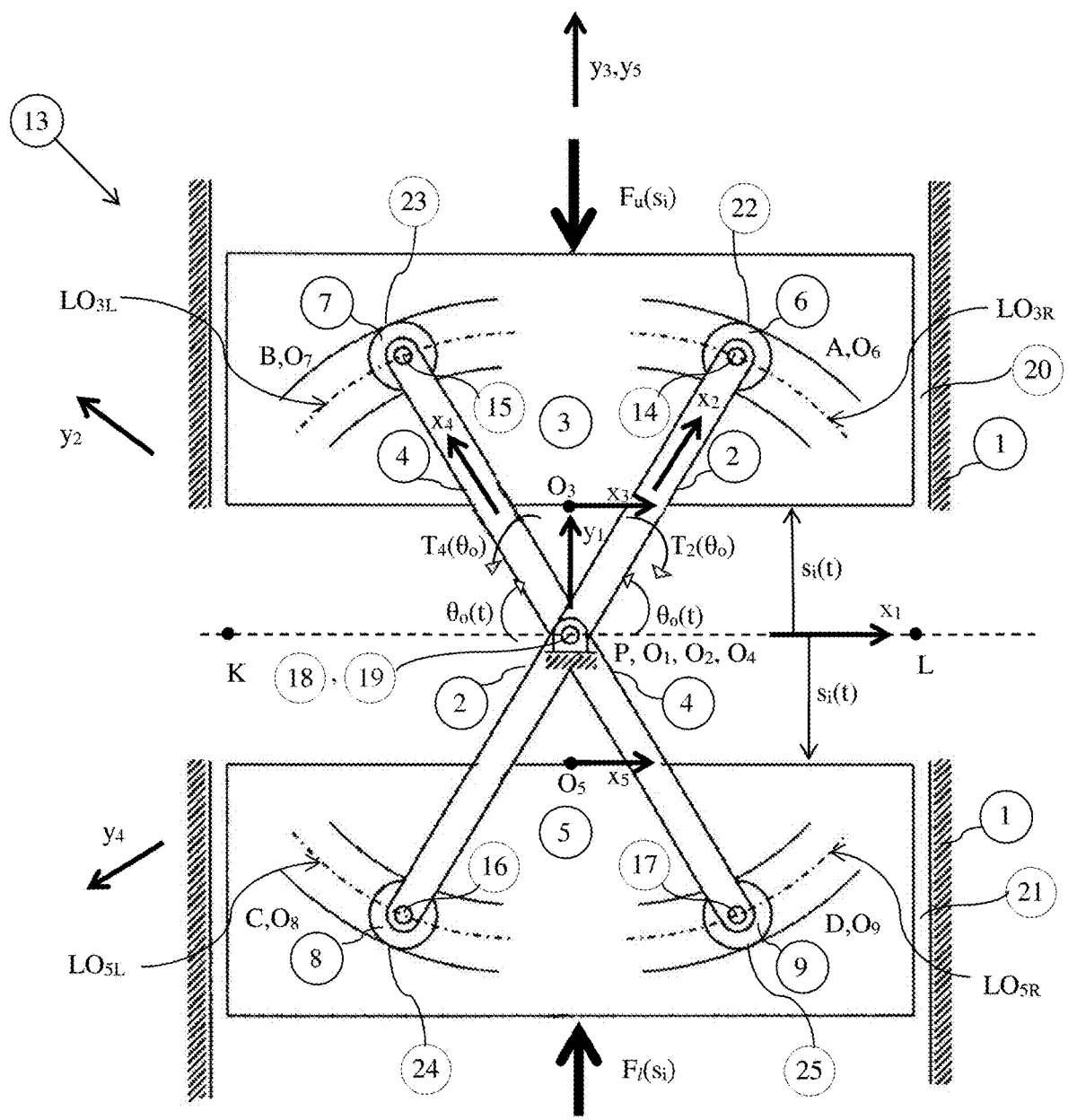

FIG. 5—Schematic view of the Minimum Friction and Shaking-Translation to any Rotation (MinFaS-TaR) (13) mechanism which differs from the mechanical torque generator (11) with respect to the loading conditions only.

FIG. 6—Table showing the conditions that the mechanical torque generator (11) and the MinFaS-TaR (13) mechanisms must satisfy.

All parts shown in the figures have been numbered; leading to the correspondences that are listed below.
1. Link 1
2. Link 2
3. Link 3
4. Link 4
5. Link 5
6. Link 6
7. Link 7
8. Link 8
9. Link 9
10. Spring
11. Mechanical Torque Generator
12. Equivalent Mechanical Torque Generator-1&3 mechanism
13. Minimum Friction and Shaking-Translation to any Rotation mechanism
14. Revolute joint that connects link 2 (2) and link 6 (6)
15. Revolute joint that connects link 4 (4) and link 7 (7)
16. Revolute joint that connects link 2 (2) and link 8 (8)
17. Revolute joint that connects link 4 (4) and link 9 (9)
18. Revolute joint that connects link 1 (1) and link 2 (2)
19. Revolute joint that connects link 1 (1) and link 4 (4)
20. Prismatic joint that connects link 1 (1) and link 3 (3)
21. Prismatic joint that connects link 1 (1) and link 5 (5)
22. Cylinder in slot joint that connects link 3 (3) and link 6 (6)
23. Cylinder in slot joint that connects link 3 (3) and link 7 (7)
24. Cylinder in slot joint that connects link 5 (5) and link 8 (8)
25. Cylinder in slot joint that connects link 5 (5) and link 9 (9)
26. Cylinder in slot joint that connects link 1 (1) and link 3 (3)

DETAILED DESCRIPTION OF THE INVENTION

A schematic view of the Mechanical Torque Generator (11) is given in FIG. 2. In the MTG (11), there are totally 9 links, including the ground which is labelled as link 1. $O_1x_1y_1$, $O_2x_2y_2$, $O_3x_3y_3$, $O_4x_4y_4$, $O_5x_5y_5$, $O_6x_6y_6$, $O_7x_7y_7$, $O_8x_8y_8$ and $O_9x_9y_9$ coordinate systems are reference frames which are connected to links 1,2,3,4,5,6,7,8 and 9 (1,2,3,4, 5,6,7,8 and 9) respectively, such that $x_3$ and $x_5$ axes are parallel to the $x_1$ axis; $y_3$ and $y_5$ axes, on the other hand, are parallel to the $y_1$ axis. In order not to make the figure more complicated, the x and y axes belonging to links 6, 7, 8 and 9 (6,7,8 and 9) have not been shown in FIG. 2.

The joints used in the MTG (11) are shown in FIG. 3. In this table, R, P, and $C_s$ symbolizes a revolute joint, a prismatic joint and a cylinder in slot joint, respectively. By using FIG. 3, it is possible to observe which link is connected to which other link, and with what kind of a joint. For example, when one considers the 5$^{th}$ row of the 9×9 matrix given in FIG. 3, it is observed that link 5 (5) is connected to links 1, 8 and 9 (1, 8 and 9) by means of a prismatic joint (21), cylinder in slot joint (24) and another cylinder in slot joint (25), respectively.

Roller number 6 (6) used in the MTG (11) moves inside a slot on link 3 (3). The curve that is located exactly in the middle of this slot, labelled as $LO_{3R}$ (see FIG. 2), is the locus, on link 3 (3), of point $A_6$ on link 6 (6). Here, $A_6$ symbolyses point A on link 6 (6). In general, on the other hand, $P_i$ defines point P on link i. Point $B_7$, on the other hand, follows the curve $LO_{3L}$ on link 3 (3). Similarly, points $D_9$ and $C_8$ move along the curves $LO_{5R}$ and $LO_{5L}$ on link 5 (5), respectively.

The output links of the mechanical torque generator (11) are links 2 and 4 (2 and 4), the angular positions of which are shown by $\theta_o(t)$. The torques $T_2(\theta_o)$ and $T_4(\theta_o)$ in FIG. 2, on the other hand, indicate the torques generated by the mechanical torque generator (11) (i.e., the outputs of the generator). Since these torques have to be equal to each other (see equation (E48)), both torques can be denoted by $T(\theta_o)$. As can be understood from the symbols that are used, the torques $T_2(\theta_o)$ and $T_4(\theta_o)$ depend on the angular position of the output link.

In FIG. 2, there is a spring (10), with a spring constant of $k_u$, between the fixed chassis (1) and link 3 (3). The spring constant of the spring (10) between the chassis (1) and link 5 (5), on the other hand, is labelled as $k_l$.

The mechanical torque generator (11) is a planar mechanism, the input link of which executes translational motion, whereas, the output link of which executes rotational motion around a fixed axis; the practical degree of freedom which is 1; and for which, it is possible to obtain any relation between the input link's position, $s_i(t)$, and the output link's angular position, $\theta_o(t)$ (See FIG. 2), that can be expressed as $$\theta_o = f(s_i) \tag{E1}$$

when the kinematic dimensions of the MTG (11) are designed appropriately. Here, $f(s_i)$ symbolizes any function which depends on $s_i$, such that the function and its derivatives are continuous. Furthermore, it is useful to remember that, if desired, instead of equation (E1), the desired input-output relationship can be expressed as $s_i=g(\theta_o)$.

By using the MTG (11), in addition to generating a desired input-output relationship, it is also possible to generate any desired torque $T(\theta_o)$ by properly designing the kinematic dimensions of the mechanical torque generator (11), the free lengths of the springs used and the spring constants $k_u$ and $k_l$.

In order to find the degree of freedom of the mechanical torque generator (11), the equation $$F = \lambda(l-j-1) + \sum_{i=1}^{i=j} f_i \quad \text{(E2)}$$

may be used. Here, F, $\lambda$, l and j denote the degree of freedom of the mechanism, the degree of freedom of the space in which the mechanism works, the number of links of the mechanism and the number of joints of the mechanism, respectively. $f_i$, on the other hand, is the degree of freedom of joint i. Since the MTG (11) is a planar mechanism, one has $$\lambda=3 \quad \text{(E3)}$$

Furthermore, using FIG. 2 and FIG. 3, one obtains $$l=9 \quad \text{(E4)}$$

$$j=12 \quad \text{(E5)}$$

As seen in FIG. 3, in the MTG (11), there are six 1 degree of freedom revolute joints (14), (15), (16), (17), (18), (19); two 1 degree of freedom prismatic joints (20), (21); and four 2 degree of freedom cylinder in slot joints (22), (23), (24), (25). Hence, one obtains $$\sum_{i=1}^{i=j} f_i = 6 \times 1 + 2 \times 1 + 4 \times 2 = 16 \quad \text{(E6)}$$

If equations (E3)-(E6) are substituted into equation (E2), one obtains $$F=4 \quad \text{(E7)}$$

On the other hand, the real degree of freedom of the mechanism should be $$F_g=5 \quad \text{(E8)}$$

The reason for the difference between the degree of freedom obtained by using equation (E2) and the real degree of freedom is that, the MTG (11) is a mechanism which is in permanently critical form. In other words, because of the special kinematic dimensions used in the MTG (11) [See equations (E10)-(E22)], the constraints due the joints of the MTG (11) are not independent from each other. Because of these special kinematic dimensions, the coordinates, with respect to the $O_1x_1y_1$ coordinate system fixed to the ground (1), of the points $A_2$, $B_4$, $C_2$ and $D_4$ (See FIG. 2), which are the centers of the disks 6,7,8 and 9 (6, 7, 8 and 9), are $(x_a, y_a)$, $(-x_a, y_a)$, $(-x_a, -y_a)$ and $(x_a, -y_a)$, respectively, throughout the totality of the motion.

On the other hand, when the usage of the mechanism is considered, it can be said that the practical degree of freedom of the mechanical torque generator is $$F_{g,p}=F_g-4=1 \quad \text{(E9)}$$

since rotations of links 6, 7, 8 and 9 (6, 7, 8 and 9), around the axes which pass through the points A, B, C and D and which are parallel to the $z_1$ axis, have no importance in an application.

The special kinematic dimensions that are used in the MTG (11), and that have been mentioned above, are listed below.

$$\overline{P_2A_2}=\overline{P_2C_2}=\overline{P_4B_4}=\overline{P_4D_4} \quad \text{(E10)}$$

$$(K_1P_1L_1 \text{ line}) \Leftrightarrow (x_1 \text{ axis}) \quad \text{(E11)}$$

$$(y_3 \text{ axis}) \Leftrightarrow (y_1 \text{ axis}) \quad \text{(E12)}$$

$$(y_5 \text{ axis}) \Leftrightarrow (y_1 \text{ axis}) \quad \text{(E13)}$$

$$r_6=r_7=r_8=r_9 \quad \text{(E14)}$$

$$x_{LO_{3R}}=f(p) \quad \text{(E15)}$$

$$y_{LO_{3R}}=g(p) \quad \text{(E16)}$$

$$x_{LO_{3L}}=-f(p) \quad \text{(E17)}$$

$$y_{LO_{3L}}=g(p) \quad \text{(E18)}$$

$$x_{LO_{5R}}=f(p) \quad \text{(E19)}$$

$$y_{LO_{5R}}=-g(p) \quad \text{(E20)}$$

$$x_{LO_{5L}}=-f(p) \quad \text{(E21)}$$

$$y_{LO_{5L}}=-g(p) \quad \text{(E22)}$$

The symbol "$\Leftrightarrow$" in equations (E11)-(E13) has been used to mean "coincident"; whereas, in equation (E14), $r_6$, $r_7$, $r_8$ and $r_9$ symbolize the radii of the disks 6, 7, 8 and 9 (6, 7, 8 and 9), respectively. $(x_{LO_{3R}}, y_{LO_{3R}})$ symbolizes the x and y coordinates, with respect to the $O_3x_3y_3$ system, of a point on the $LO_{3R}$ curve. On the other hand, $(x_{LO_{3L}}, y_{LO_{3L}})$ symbolizes the x and y coordinates, with respect to the $O_3x_3y_3$ system, of a point on the $LO_{3L}$ curve. In a similar manner, $(x_{LO_{5R}}, y_{LO_{5R}})$ and $(x_{LO_{5L}}, y_{LO_{5L}})$ indicate the x and y coordinates, with respect to the $O_5x_5y_5$ system, of a point on the $LO_{5R}$ and $LO_{5L}$ curves, respectively. On the other hand, p symbolizes a parameter, the lower and upper bounds of which are $p_{min}$ and $p_{max}$. In other words, there is a constraint on the parameter p that can be expressed in the form $$p_{min} \leq p \leq p_{max} \quad \text{(E23)}$$

Finally, f and g are two functions which are used to define the curves $LO_{3R}$, $LO_{3L}$, $LO_{5R}$ and $LO_{5L}$. Here, the functions $$f(p), \frac{df}{dp}, \frac{d^2f}{dp^2}, g(p), \frac{dg}{dp} \text{ and } \frac{d^2g}{dp^2}$$

should be continuous.

Provided that the kinematic dimensions of the MTG (11) satisfy the conditions given by equations (E10)-(E22), throughout the motion of torque generator, one will have $$\angle K_1P_1B_4 = \angle L_1P_1A_2 \quad \text{(E24)}$$

$$\overline{O_1O_3} = \overline{O_1O_5} \quad \text{(E25)}$$

In FIG. 2, angle $\angle K_1P_1B_4$ and length $\overline{O_1O_3}$ have been indicated as $\theta_o(t)$ and $s_i(t)$, respectively.

There are conditions that should be satisfied by the inertial parameters of the links of the MTG (11) too. These conditions are listed below.

$$m_2 = m_4 \tag{E26}$$

$$m_3 = m_5 \tag{E27}$$

$$m_6 = m_7 = m_8 = m_9 \tag{E28}$$

$$x_{G_2} = 0 \tag{E29}$$

$$x_{G_3} = 0 \tag{E30}$$

$$x_{G_4} = 0 \tag{E31}$$

$$x_{G_5} = 0 \tag{E32}$$

$$x_{G_6} = 0 \tag{E33}$$

$$x_{G_7} = 0 \tag{E34}$$

$$x_{G_8} = 0 \tag{E35}$$

$$x_{G_9} = 0 \tag{E36}$$

$$y_{G_2} = 0 \tag{E37}$$

$$y_{G_4} = 0 \tag{E38}$$

$$y_{G_6} = 0 \tag{E39}$$

$$y_{G_7} = 0 \tag{E40}$$

$$y_{G_8} = 0 \tag{E41}$$

$$y_{G_9} = 0 \tag{E42}$$

$$I_{G_2} = I_{G_4} \tag{E43}$$

$$I_{G_6} = I_{G_7} = I_{G_8} = I_{G_9} \tag{E44}$$

Here, $G_i$, $m_i$, $x_{G_i}$ and $y_{G_i}$ symbolize the center of gravity, mass, the x coordinate of the center of gravity, with respect to the $O_i x_i y_i$ system attached to link i, and the y coordinate of the center of gravity, with respect to the $O_i x_i y_i$ system of link i, of link i, respectively. $I_{G_i}$, on the other hand, is the moment of inertia of link i with respect to an axis which passes from $G_i$ and which is parallel to the $z_1$ axis.

Finally, the conditions that should be satisfied by the external forces and external moments (See FIG. 2) applied to the MTG(11) are given below.

$$(k_u \text{ spring}) \Leftrightarrow (y_1 \text{ axis}) \tag{E45}$$

$$(k_l \text{ spring}) \Leftrightarrow (y_1 \text{ axis}) \tag{E46}$$

$$\vec{F}_{k_u} = -\vec{F}_{k_l} \tag{E47}$$

$$T_4(\theta_o) = T_2(\theta_o) \tag{E48}$$

In equality (E47), $\vec{F}_{k_u}$ and $\vec{F}_{k_l}$ indicate the forces applied to links 3 and 5 (3 and 5) by the springs (10) with spring constants $k_u$ and $k_l$, respectively.

Now, let us consider a planar mechanism which is named as Equivalent Mechanical Torque Generator-1 & 2. Except for the type of joint which connects links 1 and 2 (1 and 2), EqMTG$_{1\&2}$ and the MTG (11) shown in FIG. 2 are the same mechanism. In the MTG (11), there is a revolute joint, (18), between link 2 (2) and the ground (1). On the other hand, in the EqMTG$_{1\&2}$, link 2 (2) and the ground (1) are connected to each other by means of a 2 degree of freedom cylinder in slot joint. This aforementioned cylinder in slot joint causes the path, on link 1 (1), of point $(O_2)_2$ to be coincident with the $x_1$ axis [or, any line which passes through the origin $(O_1)_1$]; and it also causes link 2 (2) to rotate, with respect to link 1 (1), around an axis which is parallel to the $z_1$ axis and which passes through the point $(O_2)_2$. Here, $(O_2)_2$ symbolizes the origin $O_2$ on link 2 (2). Furthermore, the kinematic dimensions of the EqMTG$_{1\&2}$ mechanism satisfy conditions (E10)-(E22). When the degree of freedom of the EqMTG$_{1\&2}$ mechanism is calculated by using equation (E2), one obtains $$F = 5 \tag{E49}$$

The degree of freedom thus obtained is the actual degree of freedom of the EqMTG$_{1\&2}$ mechanism. Because of this, on the contrary to the MTG (11) mechanism, the EqMTG$_{1\&2}$ mechanism is not a mechanism which is in permanently critical form. In case the kinematic dimensions and the input motions of the EqMTG$_{1\&2}$ and MTG (11) mechanisms are the same, the motions of the mechanisms will also be the same.

In FIG. 4, a planar mechanism named as Equivalent Mechanical Torque Generator-1 & 3 (12) is shown. The $C_{13}$ curves in FIG. 4 lie on a circle with radius $b_1$ and center U3$_3$. Here, U3$_3$ symbolizes a point which lies on link 3 (3) and which is located on the $y_3$ axis. If EqMTG$_{1\&3}$ (12) and MTG (11) shown in FIG. 2 are compared, it will be seen that the mechanisms are the same except for the type of joint that connects links 1 and 3 (1 and 3). In the MTG (11), there is a prismatic joint (20) between link 3 (3) and the ground (1). On the other hand, in the EqMTG$_{1\&3}$ (12), link 3 (3) and the ground (1) are connected to each other by the cylinder in slot joint (26). This cylinder in slot joint (26) causes the path, on link 1 (1), of the point U3$_3$ to be coincident with the $y_1$ axis; and it also causes link 3 (3) to rotate, relative to link 1 (1), around an axis which is parallel to the $z_1$ axis and which passes through the point U3$_3$. Furthermore, the kinematic dimensions of the EqMTG$_{1\&3}$ mechanism (12) satisfy conditions (E10)-(E22). Similar to the EqMTG$_{1\&2}$ mechanism, the EqMTG$_{1\&3}$ mechanism (12) is a 5 degree of freedom mechanism which is not in permanently critical form. Again, as was the case in the EqMTG$_{1\&2}$ mechanism, in case the kinematic dimensions and the input motions of the EqMTG$_{1\&3}$ (12) and MTG (11) mechanisms are the same, the motions of the EqMTG$_{1\&3}$ (12) and MTG (11) mechanisms will also be the same.

The Equivalent Mechanical Torque Generator-1 & 4 (EqMTG$_{1\&4}$) mechanism, on the other hand, has been obtained, in a similar manner to the EqMTG$_{1\&2}$ mechanism, by eliminating the revolute joint (19) in the MTG (11); and by replacing it with a cylinder in slot joint instead. This aforementioned cylinder in slot joint causes the path, on link 1 (1), of the point $(O_4)_4$ to be coincident with the $x_1$ axis [or, any line passing through the origin $(O_1)_1$]; and it also causes link 4 to rotate, relative to link 1 (1), around an axis which is parallel to the $z_1$ axis and which passes through the point $(O_4)_4$. Here, $(O_4)_4$ symbolizes the origin $O_4$ on link 4 (4). In a similar manner to the EqMTG$_{1\&3}$ mechanism (12), the Equivalent Mechanical Torque Generator-1 & 5 (EqMTG$_{1\&5}$) mechanism has been obtained by eliminating the prismatic joint (21) in the MTG (11); and by replacing it with a cylinder in slot joint instead. This aforementioned cylinder in slot causes the path, on link 1 (1), of the point $(U5)_5$ to be coincident with the $y_1$ axis; and it also causes link 5 (5) to rotate, relative to link 1 (1), around an axis which is parallel to the $z_1$ axis and which passes through the point $(U5)_5$. Here, $(U5)_5$ symbolizes a point which lies on link 5 (5) and which is located on the $y_5$ axis. EqMTG$_{1\&4}$ and EqMTG$_{1\&5}$ mechanisms have the same properties with EqMTG$_{1\&2}$ and EqMTG$_{1\&3}$ (12).

Now, related to the (EqMTG$_{1\&3}$) (12) mechanism shown in FIG. 4, let us consider the 6 conditions that are given below.

(C1) The kinematic dimensions of the mechanism satisfy equalities (E10)-(E22).

(C2) The inertial parameters of the mechanism satisfy equalities (E26)-(E44).

(C3) The loading conditions of the mechanism satisfy equalities (E45)-(E48).

(C4) Gravitational acceleration, $\vec{g}$, is zero.

(C5) The friction related properties of the 4 revolute joints (14), (15), (16), (17) which connect links 6, 7, 8 and 9 (6, 7, 8 and 9) to links 2 and 4 (2 and 4) are equal to each other.

(C6) The friction related properties of the 4 cylinder in slot joints (22), (23), (24), (25) which connect links 6, 7, 8 and 9 (6, 7, 8 and 9) to links 3 and 5 (3 and 5) are equal to each other.

In case the above conditions are satisfied, all of the reaction forces and moments at the joints that connect the mechanism to the ground (1) will always [i.e., for any given input motion $s_i(t)$; for any given $\theta_o = f(s_i)$ relation given by equation (E1); and for any time t] be obtained to be $$\vec{F}_{12}(t) = F_{12}^x(t)\vec{i}_1 + F_{12}^y(t)\vec{j}_1 = \vec{0} \qquad (E50)$$

$$\vec{F}_{13}(t) = F_{13}(t)\vec{i}_1 = \vec{0} \qquad (E51)$$

$$\vec{F}_{14}(t) = F_{14}^x(t)\vec{i}_1 + F_{14}^y(t)\vec{j}_1 = \vec{0} \qquad (E52)$$

$$\vec{F}_{15}(t) = F_{15}(t)\vec{i}_1 = \vec{0} \qquad (E53)$$

$$\vec{M}_{15}(t) = M_{15}(t)\vec{k}_1 = \vec{0} \qquad (E54)$$

Here, $\vec{F}_{1i}(t)$ and $\vec{M}_{1i}(t)$ [i=2, 3, 4, 5] symbolize the reaction forces and moments, arising due to a revolute, prismatic, or cylinder in slot joint, that are exerted on link i by the ground. $F_{1i}^x$ and $F_{1i}^y$ on the other hand, indicate the $x_1$ and $y_1$ components of the force $\vec{F}_{1i}$. Furthermore, $\vec{i}_1$, $\vec{j}_1$ and $\vec{k}_1$ are unit vectors which are parallel to the $x_1$, $y_1$ and $z_1$ axes. As can be seen from equations (E50)-(E54) clearly, the shaking force and the $z_1$ component of the shaking moment transmitted to the ground (1), by the EqMTG$_{1\&3}$ mechanism (12), are zero. Furthermore, since the reaction forces and moments at each of the 4 joints that connect the mechanism to the ground are zero, the Coulomb friction forces at each of these joints will also be zero. Here, one should pay attention to the fact that, whatever the torque produced by the EqMTG$_{1\&3}$ (12) and whatever the accelerations of the links of the EqMTG$_{1\&3}$ (12) are, the shaking force, the shaking moment and the frictional forces are still zero.

In case they satisfy the conditions that the EqMTG$_{1\&3}$ (12) mechanism must satisfy, which are conditions C1-C6 given above, in a similar manner, in the EqMTG$_{1\&2}$, EqMTG$_{1\&4}$ and EqMTG$_{1\&5}$ mechanisms, independent from the generated torque $T(\theta_o)$ and the accelerations of the links, the shaking force transmitted to the ground, the shaking moment transmitted to the ground and the Coulomb frictional forces at each of the 4 links which connect the mechanism to the ground will be zero.

As mentioned before, the MTG (11) that is shown in FIG. 2 is a mechanism which is in permanently critical form. For this reason, the dynamic force analysis of the mechanism is a problem that involves static indeterminacy. In other words, in order to perform a dynamic force analysis of the mechanism; besides the equations obtained from rigid body mechanics, one also needs deformation equations arising from the flexibility of the links. For this reason, when only the equations obtained from rigid body mechanics are used, the dynamic force analysis of the (MTG) (11) will yield infinitely many solutions. In case the MTG (11) satisfies the 6 conditions related to the EqMTG$_{1\&3}$ mechanism (12) given before (i.e., conditions C1-C6), these aforementioned solutions will also include the dynamic force analysis solutions of the EqMTG$_{1\&2}$, EqMTG$_{1\&3}$ (12), EqMTG$_{1\&4}$ and EqMTG$_{1\&5}$ mechanisms, i.e., the solutions given by equations (E50)-(E54). For this reason, by designing the link flexibilities of the MTG (11) properly, it is also possible to make the shaking force transmitted to the ground, the shaking moment transmitted to the ground and the Coulomb frictional forces at each of the 4 joints that connect the mechanism to the ground zero; or, approximately zero.

In case condition (C4), which is one of the 6 conditions related to the MTG (11), EqMTG$_{1\&2}$, EqMTG$_{1\&3}$ (12), EqMTG$_{1\&4}$ and EqMTG$_{1\&5}$ mechanisms, is not satisfied (i.e., gravitational acceleration, $\vec{g}$, is not zero), although the shaking force transmitted to the ground, the shaking moment transmitted to the ground and the Coulomb frictional forces at each of the 4 joints that connect the mechanism to the ground will not be zero; basically, they will be due to the weights of the links only and they will be independent from the generated torque $T(\theta_o)$ and the accelerations of the links.

In FIG. 5, a mechanism, which differs from the MTG (11) only with respect to the loading, is shown. In this mechanism, the 2 springs (10) that exist in the MTG (11) have been removed; and the external forces $F_u(s_i)$ and $F_l(s_i)$ have been substituted instead. The aforementioned 2 external forces should satisfy the conditions given below.

$$F_u(s_i) \Leftrightarrow (y_1 \text{ axis}) \qquad (E55)$$

$$F_l(s_i) \Leftrightarrow (y_1 \text{ axis}) \qquad (E56)$$

$$F_u(s_i) = F_l(s_i) \qquad (E57)$$

The mechanism given in FIG. 5 is named as the Minimum Friction and Shaking-Translation to any Rotation mechanism (13); and, similar to the MTG (11) mechanism, it is a mechanism which is in permanently critical form. The conditions that should be satisfied by the kinematic dimensions, the inertial parameters and the loading conditions of the MTG (11) and the MinFaS-TaR (13) mechanisms are given in the table presented in FIG. 6.

Now, similar to the EqMTG$_{1\&3}$ (12) mechanism, let us consider the mechanism named as Equivalent Minimum Friction and Shaking-Translation to any Rotation-1&3 (EqMinFaS-TaR$_{1\&3}$) mechanism. Except for the type of joint that connects links 1 and 3 (1 and 3), the EqMinFaS-TaR$_{1\&3}$ and MinFaS-TaR (13) mechanisms are the same. In the MinFaS-TaR (13), there is a prismatic joint (20) between link 3 (3) and the ground (1). In the EqMinFaS-TaR$_{1\&3}$ mechanism, on the other hand, link 3 (3) and the ground (1) have been connected by a cylinder in slot joint. The aforementioned cylinder in slot joint causes the path, on link 1 (1), followed by the point U3$_3$ to coincide with the $y_1$ axis; and it also causes link 3 (3) to rotate, relative to link 1 (1), around an axis which is parallel to the $z_1$ axis and which passes through the point U3$_3$. Here, U3$_3$ symbolizes a point on link 3 (3) that is located on the $y_3$ axis. On the contrary to the MinFaS-TaR (13) mechanism, the EqMinFaS-TaR$_{1\&3}$ mechanism is not a mechanism which is in permanently critical form. In case the kinematic dimensions and the input motions of the EqMinFaS-TaR$_{1\&3}$ and MinFaS-TaR (13) mechanisms are the same, the motions of the mechanisms are also the same. EqMinFaS-TaR$_{1\&2}$, EqMinFaS-TaR$_{1\&4}$ and EqMinFaS-TaR$_{1\&5}$ mechanisms are also defined in a similar manner to the EqMinFaS-TaR$_{1\&3}$ mechanism. All of the claims made previously for the MTG (11), EqMTG$_{1\&2}$, EqMTG$_{1\&3}$ (12), EqMTG$_{1\&4}$ and EqMTG$_{1\&5}$ mechanisms (related to the shaking force transmitted to the ground, shaking moment transmitted to the ground and the Coulomb frictional forces at each of the 4 joints that connect the mechanism to the ground) are also valid for the MinFaS-TaR (13), EqMinFaS-TaR$_{1\&2}$, EqMinFaS-TaR$_{1\&3}$, EqMinFaS-TaR$_{1\&4}$ and EqMinFaS-TaR$_{1\&5}$ mechanisms. In other words, in the MinFaS-TaR (13), EqMinFaS-TaR$_{1\&2}$, EqMinFaS-TaR$_{1\&3}$, EqMinFaS-TaR$_{1\&4}$ and EqMinFaS-TaR$_{1\&5}$ mechanisms, the shaking force transmitted to the ground, the shaking moment transmitted to the ground and the Coulomb frictional forces at each of the 4 joints that connect the mechanism to the ground, will be, basically, due to the weights of the links only.

As mentioned before, if the loading conditions are not considered, the MTG (11) and the MinFaS-TaR (13) mechanisms shown in FIG. 2 and FIG. 5 have no differences from each other. In other words, from a kinematic point of view, the MTG (11) and MinFaS-TaR (13) mechanisms are the same mechanism. Both mechanisms have been obtained from a planar kinematic chain [which is obtained by connecting 9 links to each other by using 6 revolute joints, 2 prismatic joints and 4 cylinder in slot joints, in accordance with the table in FIG. 3; and the kinematic dimensions of which satisfy conditions (E10)-(E22)] by making link 1 (1) to be unmoveable (i.e., by making link 1 (1) to be the ground). The aforementioned novel kinematic chain has been named as Kinematic Chain with 2 Optimum Revolute and 2 Optimum Prismatic Joints (KCw2ORa2OPJ) in this description. Since KCw2ORa2OPJ is a mechanism which is in permanently critical form, all of the mechanisms that are obtained from this chain by using the kinematic inversion method will also be mechanisms which are in permanently critical form.

In this description, the kinematic chain that the EqMTG$_{1\&3}$ (12) and the EqMinFaS-TaR$_{1\&3}$ mechanisms, which do not differ from each other except for the loading conditions, are derived from has been named as Equivalent Kinematic Chain with 2 Optimum Revolute and 2 Optimum Prismatic Joints-1 & 3 (EqKCw2ORa2OPJ$_{1\&3}$). Since EqKCw2ORa2OPJ$_{1\&3}$, the kinematic dimensions of which satisfy conditions (E10)-(E22), is a planar kinematic chain which is not in permanently critical form; all of the mechanisms that are obtained from this kinematic chain by using the method of kinematic inversion will also be mechanisms which are not in permanently critical form.

In a similar manner, the kinematic chain that the EqMTG$_{1\&2}$ and EqMinFaS-TaR$_{1\&2}$ mechanisms [which, if the loading conditions are not considered, do not have any differences from each other at all] are derived from is named, in this description, as Equivalent Kinematic Chain with 2 Optimum Revolute and 2 Optimum Prismatic Joints-1 & 2 (EqKCw2ORa2OPJ$_{1\&2}$). Furthermore, the kinematic chain from which the EqMTG$_{1\&4}$ and EqMinFaS-TaR$_{1\&4}$ mechanisms are derived from; and the kinematic chain from which the EqMTG$_{1\&5}$ and EqMinFaS-TaR$_{1\&5}$ mechanisms are derived from are named, in this description, as Equivalent Kinematic Chain with 2 Optimum Revolute and 2 Optimum Prismatic Joints1 & 4 (EqKCw2ORa2OPJ$_{1\&4}$) and Equivalent Kinematic Chain with 2 Optimum Revolute and 2 Optimum Prismatic Joints-1 & 5 (EqKCw2ORa2OPJ$_{1\&5}$), respectively. Since EqKCw2ORa2OPJ$_{1\&2}$ EqKCw2ORa2OPJ$_{1\&4}$ and EqKCw2ORa2OPJ$_{1\&5}$ planar kinematic chains, the kinematic dimensions of which satisfy conditions (E10)-(E22), are kinematic chains which are not in permanently critical form; the mechanisms that are obtained from these kinematic chains by using the method of kinematic inversion will also be mechanisms which are not in permanently critical form.

In order not to make the notation used more complicated, although they are the same kinematic chain in reality, the kinematic chains EqKCw2ORa2OPJ$_{1\&2}$ and EqKCw2ORa2OPJ$_{1\&4}$ have different names in this description. By the same reason, although they are not different kinematic chains, the kinematic chains EqKCw2ORa2OPJ$_{1\&3}$ and EqKCw2ORa2OPJ$_{1\&5}$ have different names in this description.

Provided that all mechanisms which are obtained from the EqKCw2ORa2OPJ$_{1\&2}$ EqKCw2ORa2OPJ$_{1\&3}$, EqKCw2ORa2OPJ$_{1\&4}$ and EqKCw2ORa2OPJ$_{1\&5}$ kinematic chains by the method of kinematic inversion satisfy conditions (C1)-(C6), the reaction forces and moments and the Coulomb friction forces at each of the 4 joints that connect link 1 (1) to links 2,3,4 and 5 (2,3,4 and 5) will arise from the external forces and external moments acting on link 1 (1) only and the inertial forces and inertial moments, due to D'Alembert's principle, acting on link 1 (1). In other words, in a similar manner to the EqMTG$_{1\&2}$, EqMTG$_{1\&3}$ (12), EqMTG$_{1\&4}$ and EqMTG$_{1\&5}$ mechanisms, the reaction forces, the reaction moments and the Couloumb friction forces at the aforementioned 4 joints will be independent from the accelerations of the links other than link 1 (1) and $T_2(\theta_o)$, $T_4(\theta_o)$, $\vec{F}_{k_u}$ and $\vec{F}_{k_j}$.

As stated before, the mechanisms which are obtained from the kinematic chain KCw2ORa2OPJ will be mechanisms which are in permanently critical form. For this reason, the dynamic force analyses of these mechanisms will lead to problems which involve static indeterminacy. On the other hand, if the mechanisms which are obtained from the KCw2ORa2OPJ kinematic chain with the method of kinematic inversion satisfy conditions (C1)-(C6); and moreover, if, similar to the MTG (11) mechanism, the flexibilities of the links are designed in an appropriate manner; the reaction forces and moments and the Coulomb friction forces at each of the 2 revolute (18), (19) and 2 prismatic (20), (21) joints which connect link 1 (1) to links 2, 3, 4 and 5 (2, 3, 4 and 5) will, to a large extent, arise from the external forces and external moments acting on link 1 (1) only and the inertial forces and inertial moments, due to D'Alembert's principle, acting on link 1 (1). In other words, the reaction forces, the reaction moments and the Couloumb friction forces at the aforementioned 4 joints, will be, to a large extent, independent from the accelerations of the links other than link 1 (1) and $T_2(\theta_o)$, $T_4(\theta_o)$, $\vec{F}_{k_u}$ and $\vec{F}_{k_j}$.

In case condition (C4) is not satisfied, i.e., the gravitational acceleration is not zero, in the kinematic chains EqKCw2ORa2OPJ, EqKCw2ORa2OPJ$_{1\&2}$, EqKCw2ORa2OPJ$_{1\&3}$, EqKCw2ORa2OPJ$_{1\&4}$ and EqKCw2ORa2OPJ$_{1\&5}$, the reaction forces and moments and the Coulomb friction forces at each of the 4 joints that connect link 1 to the other links will, moreover, be dependent on the weights of the links as well.

As is known, in a practical application, 2 links that are connected to each other by a prismatic joint are equivalent to a piston—cylinder pair that contains pressurized oil, or gas. For this reason, the mechanisms, that will be obtained using the method of kinematic inversion from the kinematic chains EqKCw2ORa2OPJ, EqKCw2ORa2OPJ$_{1\&2}$, EqKCw2ORa2OPJ$_{1\&4}$, which have two prismatic joints;

and the kinematic chains EqKCw2ORa2OPJ$_{1\&3}$ and EqKCw2ORa2OPJ$_{1\&5}$, which have one prismatic joint, are expected to be useful in many different fields such as hydraulically or pneumatically actuated machines, internal combustion engines and compressors. In the aforementioned mechanisms, any number of actuators may be used. Furthermore, spring(s) and/or damper(s) can be mounted between any two links in the mechanisms.

The invention claimed is:

1. A planar kinematic chain comprising:
first, second, third, fourth, fifth, sixth, seventh, eighth and ninth links (1, 2, 3, 4, 5, 6, 7, 8, 9), and first, second, third, fourth, fifth and sixth revolute joints (14, 15, 16, 17, 18, 19), and first and second prismatic joints (20, 21), and first, second, third and fourth cylinder in slot joints (22, 23, 24, 25);
wherein, the second link (2) and the sixth link (6) are connected by the first revolute joint (14), the fourth link (4), and the seventh link (7) are connected by the second revolute joint (15), the second link (2) and the eighth link (8) are connected by the third revolute joint (16), the fourth link (4) and the ninth link (9) are connected by the fourth revolute joint (17), the first link (1) and the second link (2) are connected by the fifth revolute joint (18), the first link (1) and the fourth link (4) are connected by the sixth revolute joint (19), the first link (1) and the third link (3) are connected by the first prismatic joint (20), the first link (1) and the fifth link (5) are connected by the second prismatic joint (21), the third link (3) and the sixth link (6) are connected by the first cylinder in slot joint (22), the third link (3) and the seventh link (7) are connected by the second cylinder in slot joint (23), the fifth link (5) and the eighth link (8) are connected by the third cylinder in slot joint (24), the fifth link (5) and the ninth link (9) are connected by the fourth cylinder in slot joint (25);
wherein, the kinematic dimensions satisfy the conditions $$\overline{PA}=\overline{PC}=\overline{PB}=\overline{PD} \quad (E58)$$

$$KPL \text{ line is coincident with the } x_1 \text{ axis} \quad (E59)$$

$$y_3 \text{ axis is coincident with the } y_1 \text{ axis} \quad (E60)$$

$$y_5 \text{ axis is coincident with the } y_1 \text{ axis} \quad (E61)$$

$$r_6=r_7=r_8=r_9 \quad (E62),$$

the parametric equations of the curve LO$_{3R}$ are given by $$x_{LO_{3R}}=f(p) \quad (E63)$$

$$y_{LO_{3R}}=g(p) \quad (E64),$$

the parametric equations of the curve LO$_{3L}$ are given by $$x_{LO_{3L}}=-f(p) \quad (E65)$$

$$y_{LO_{3L}}=g(p) \quad (E66)$$

the parametric equations of the curve LO$_{5R}$ are given by $$x_{LO_{5R}}=f(p) \quad (E67)$$

$$y_{LO_{5R}}=-g(p) \quad (E68),$$

the parametric equations of the curve LO$_{5L}$ are given by $$x_{LO_{5L}}=-f(p) \quad (E69)$$

$$y_{LO_{5L}}=-g(p) \quad (E70)$$

where,
P is a point on the first link (1), on the second link (2) and on the fourth link (4),
A, C are points on the second link (2),
B, D are points on the fourth link (4),
K, L are points on the first link (1),
$x_1$, $y_1$ are mutually perpendicular axes fixed to the first link (1), $x_2$, $y_2$ are mutually perpendicular axes fixed to the second link (2), $x_3$, $y_3$ are mutually perpendicular axes fixed to the third link (3), $x_4$, $y_4$ are mutually perpendicular axes fixed to the fourth link (4), $x_5$, $y_5$ are mutually perpendicular axes fixed to the fifth link (5),
$O_3$ and $O_5$ are origins of the body fixed coordinate systems on the third link (3) and on the fifth link (5),
$r_6$ is radius of the sixth link (6), $r_7$ is radius of the seventh link (7), $r_8$ is radius of the eighth link (8), $r_9$ is radius of the ninth link (9),
LO$_{3R}$, LO$_{3L}$ are the curves that correspond to the locus of points A, B with respect to the third link (3),
LO$_{5R}$, LO$_{5L}$ are the curves that correspond to the locus of points D, C with respect to the fifth link (5),
p is a parameter with lower and upper bounds $p_{min}$ and $p_{max}$,
$x_{LO_{3R}}$, $y_{LO_{3R}}$ are the x and y coordinates, with respect to the $O_3x_3y_3$ system, of point A,
$x_{LO_{3L}}$, $y_{LO_{3L}}$ are the x and y coordinates, with respect to the $O_3x_3y_3$ system, of point B,
$x_{LO_{5R}}$, $y_{LO_{5R}}$ are the x and y coordinates, with respect to the $O_5x_5y_5$ system of point D,
$x_{LO_{5L}}$, $y_{LO_{5L}}$ are the x and y coordinates, with respect to the $O_5x_5y_5$ system, of point C,
f(p), g(p) are two continuous functions with continuous first and second derivatives that are used to parametrically define the curves LO$_{3R}$, LO$_{3L}$, LO$_{5R}$ and LO$_{5L}$.

2. The planar kinematic chain according to claim 1,
wherein one link selected from the group consisting of the first, second, third, fourth, fifth, sixth, seventh, eighth and ninth links (1, 2, 3, 4, 5, 6, 7, 8, 9) is attached rigidly to the ground so that the aforementioned selected link is unable to move.

3. A planar kinematic chain comprising:
first, second, third, fourth, fifth, sixth, seventh, eighth and ninth links (1, 2, 3, 4, 5, 6, 7, 8, 9), and first, second, third, fourth, fifth and sixth revolute joints (14, 15, 16, 17, 18, 19), and first and second prismatic joints (20, 21), and first, second, third and fourth cylinder in slot joints (22, 23, 24, 25);
wherein, the second link (2) and the sixth link (6) are connected by the first revolute joint (14), the fourth link (4) and the seventh link (7) are connected by the second revolute joint (15), the second link (2) and the eighth link (8) are connected by the third revolute joint (16), the fourth link (4) and the ninth link (9) are connected by the fourth revolute joint (17), the first link (1) and the second link (2) are connected by the fifth revolute joint (18), the first link (1) and the fourth link (4) are connected by the sixth revolute joint (19), the first link (1) and the third link (3) are connected by the first prismatic joint (20), the first link (1) and the fifth link (5) are connected by the second prismatic joint (21), the third link (3) and the sixth link (6) are connected by the first cylinder in slot joint (22), the third link (3) and the seventh link (7) are connected by the second cylinder in slot joint (23), the fifth link (5) and the eighth link (8) are connected by the third cylinder in slot joint (24), the fifth link (5) and the ninth link (9) are connected by the fourth cylinder in slot joint (25);

wherein, the kinematic dimensions do not satisfy all of the thirteen conditions, (E58)-(E70), given in claim 1;

wherein, the actual degree of freedom, relative to any link selected from the group consisting of the first, second, third, fourth, fifth, sixth, seventh, eighth and ninth links (1, 2, 3, 4, 5, 6, 7, 8, 9), is strictly greater than the degree of freedom given by the equation $$F = \lambda(l - j - 1) + \sum_{i=1}^{i=j} f_i \quad \text{(E2)}$$

where,

F is the degree of freedom of the kinematic chain, relative to any link selected from the group consisting of the first, second, third, fourth, fifth, sixth, seventh, eighth and ninth links (1, 2, 3, 4, 5, 6, 7, 8, 9), obtained from equation (E2), $\lambda$=3=degree of freedom of planar space in which the kinematic chain is restricted to move, l=9=number of links in the kinematic chain, j=12=number of joints in the kinematic chain, $f_i$ is the degree of freedom of joint i.

4. The planar kinematic chain according to claim 3, wherein one link selected from the group consisting of the first, second, third, fourth, fifth, sixth, seventh, eighth and ninth links (1, 2, 3, 4, 4, 5, 6, 7, 8, 9) is attached rigidly to the ground so that the aforementioned selected link is unable to move.

5. A planar kinematic chain comprising:

first, second, third, fourth, fifth, sixth, seventh eighth and ninth links (1, 2, 3, 4, 5, 6, 7, 8, 9), and first, second, third, fourth, fifth and sixth revolute joints (14, 15, 16, 17, 18, 19), and second prismatic joint (21), and first, second, third, fourth and fifth cylinder in slot joints (22, 23, 24, 25, 26);

wherein, the second link (2) and the sixth link (6) are connected by the first resolute joint (4), the fourth link (4) and the seventh link (7) are connected by the second revolute joint (15), the second link (2) and the eighth link (8) are connected by the third revolute joint (16), the fourth link (4) and the ninth link (9) are connected by the fourth revolute joint (17), the first link (1) and the second link (2) are connected by the fifth revolute joint (18), the first link (1) and the fourth link (4) are connected by the sixth revolute joint (19), the first link (1) and the fifth link (5) are connected by the second prismatic joint (21), the third link (3) and the sixth link (6) are connected by the first cylinder in slot joint (22), the third link (3) and the seventh link (7) are connected by the second cylinder in slot joint (23), the fifth link (5) and the eighth link (8) are connected by the third cylinder in slot joint (24), the fifth link (5) and the ninth link (9) are connected by the fourth cylinder in slot joint (25), the first link (1) and the third link (3) are connected by the fifth cylinder in slot joint (26);

wherein, the kinematic dimensions satisfy the thirteen conditions, (E58)-(E70), given in claim 1 and conditions (E71) and (E72) given by the locus, on the first link (1), of joint U3 on the $y_3$ axis of the third link (3) is the $y_1$ axis (E71)

the third link (3) is able to rotate, relative to the first link (1), around an axis which is parallel to the $z_1$ axis and which passes through the point U3 on the $y_3$ axis of the third link (3) (E72).

6. The planar kinematic chain according to claim 5, wherein one link selected from the group consisting of the first, second, third, fourth, fifth, sixth, seventh, eighth and ninth links (1, 2, 3, 4, 5, 6, 7, 8, 9) is attached rigidly to the ground so that the aforementioned selected link is unable to move.

* * * * *